US012556618B2

(12) United States Patent
Ihlar et al.

(10) Patent No.: US 12,556,618 B2
(45) Date of Patent: Feb. 17, 2026

(54) DYNAMIC CACHING AND DELIVERY OF CONTENT IN WIRELESS COMMUNICATION NETWORK

(71) Applicant: Telefonaktiebolaget LM Ericsson (publ), Stockholm (SE)

(72) Inventors: Marcus Ihlar, Älvsjö (SE); Robert Skog, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/705,138

(22) PCT Filed: Oct. 28, 2021

(86) PCT No.: PCT/EP2021/080006
§ 371 (c)(1),
(2) Date: Apr. 26, 2024

(87) PCT Pub. No.: WO2023/072399
PCT Pub. Date: May 4, 2023

(65) Prior Publication Data
US 2025/0016244 A1    Jan. 9, 2025

(51) Int. Cl.
*G06F 15/16* (2006.01)
*H04L 67/56* (2022.01)
(52) U.S. Cl.
CPC .................................. *H04L 67/56* (2022.05)
(58) Field of Classification Search
CPC . H04L 67/56; H04L 63/0272; H04L 63/0428; H04W 12/03
See application file for complete search history.

(56) References Cited

U.S. PATENT DOCUMENTS 6,684,331 B1   1/2004  Srivastava
2015/0317169 A1*  11/2015  Sinha ................... G06F 9/4416
                                                          713/2

(Continued)

FOREIGN PATENT DOCUMENTS

EP        3316601 A1    5/2018
WO    2021062826 A1    4/2021

OTHER PUBLICATIONS

International Search Report and Written Opinion dated Jul. 21, 2022 for International Application No. PCT/EP2021/080006 filed Oct. 28, 2021, consisting of 14 pages.

(Continued)

*Primary Examiner* — John B Walsh
(74) *Attorney, Agent, or Firm* — Weisberg I.P. Law, P.A.

(57) ABSTRACT

Arrangements for handling delivery of content associated with a network-delivered service to user equipments, UEs, in a wireless communication network. The method includes transmitting a connection request message to a content delivery server for establishing a secure tunnel connection between the network function and the content delivery server. The connection request message has an identifier of the network function, intended to the content delivery server. The method includes transmitting a content request message from a first UE to the content delivery server requesting content associated with the network-delivered service. The method includes receiving a delivery request from the content delivery server requesting the network function to store and deliver the content from the network function. The method further includes forwarding the content to the first UE through a secure tunnel connection between the network function and the first UE.

19 Claims, 12 Drawing Sheets

(56) References Cited

U.S. PATENT DOCUMENTS

| | | |
|---|---|---|
| 2020/0287975 A1 | 9/2020 | Li et al. |
| 2021/0144517 A1* | 5/2021 | Guim Bernat ........ G06F 9/5072 |
| 2023/0007483 A1* | 1/2023 | Mueck ................. G06Q 50/265 |

OTHER PUBLICATIONS

A.Z. Sarker et al.; A collaborative approach to encrypted traffic; Ericsson; Jun. 25, 2020, consisting of 9 pages.

D. Schinazi et al.; MASQUE Multiplexed Application Substrate over QUIC Encryption; Internet Engineering Task Force (IETF); Mar. 2020, consisting of 30 pages.

A. Langley et al.; The QUIC Transport Protocol: Design and Internet-Scale Deployment; Proceedings of the conference of the ACM special interest group on data communication; SIGCOMM '17, Aug. 21-25, 2017, Los Angeles, CA, USA, consisting of 14 pages.

* cited by examiner

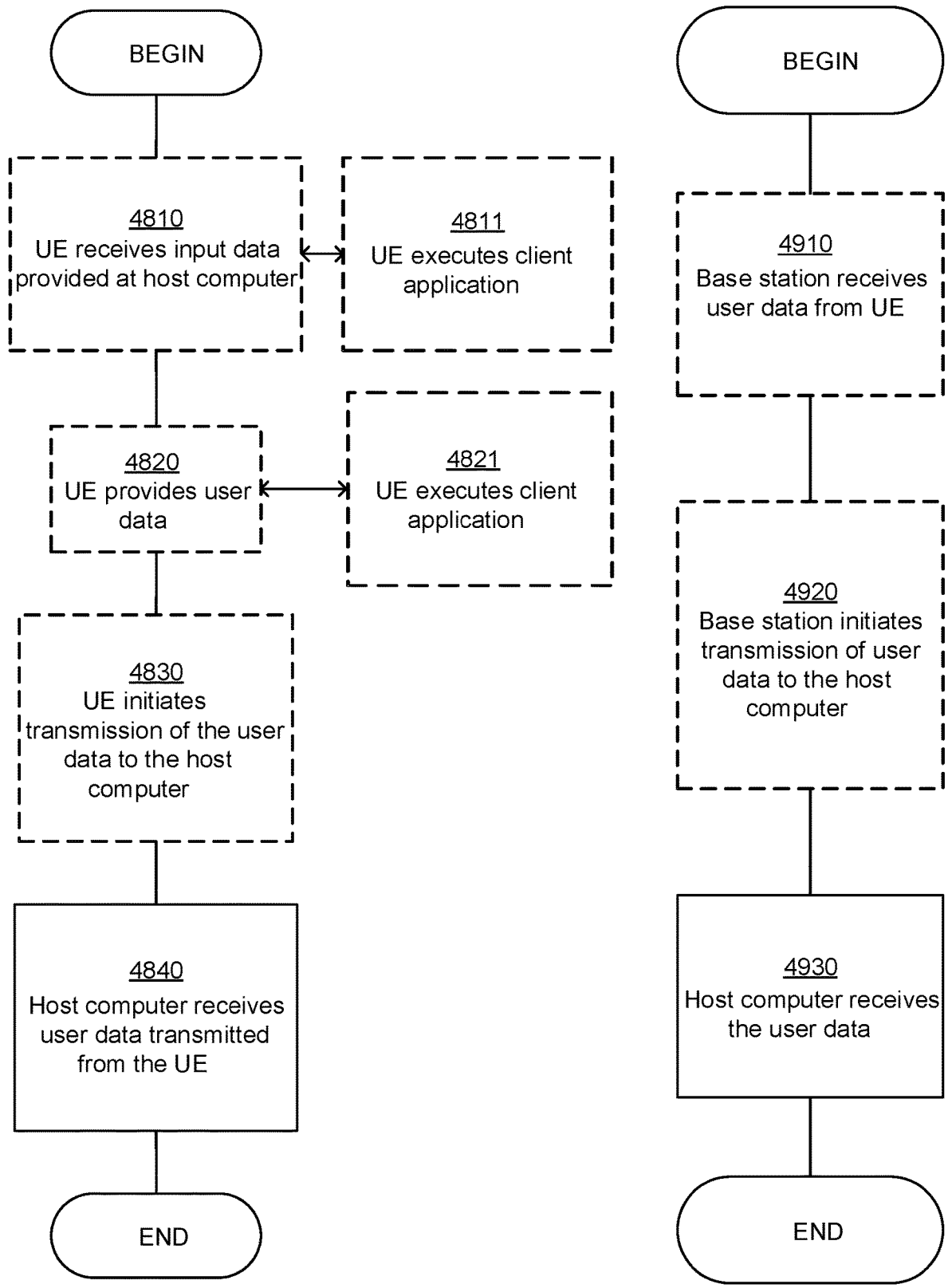

DYNAMIC CACHING AND DELIVERY OF CONTENT IN WIRELESS COMMUNICATION NETWORK

CROSS-REFERENCE TO RELATED APPLICATION

This application is a Submission Under 35 U.S.C. § 371 for U.S. National Stage Patent Application of International Application Number: PCT/EP2021/080006, filed Oct. 28, 2021 entitled "DYNAMIC CACHING AND DELIVERY OF CONTENT IN WIRELESS COMMUNICATION NETWORK," the entirety of which is incorporated herein by reference.

TECHNICAL FIELD

The present disclosure relates generally to the field of wireless communication network. More particularly, it relates to methods, network function, content delivery server, and computer program products for handling caching and delivery of content in a wireless communication network.

BACKGROUND

Video-on-demand is becoming increasingly popular. With video-on-demand, a user can select a particular content and can view the content at the same time. When the user initiates a video-on-demand session, the selected content is delivered from a content server to a user equipment, UE, for example, a mobile phone, smart phone etc., at the user's location, through a wireless communication network.

One of the drawbacks associated with video-on-demand systems involves heavy resource allocation. The content servers need to be configured to store large amounts of content. Further, networks must be able to accommodate large volumes of content data.

In the wireless communication network, when multiple UEs transmit requests to the content server for accessing the same content, the content server has to provide the same content to all the UEs that are requesting the same content. As a result, large bandwidth is consumed for transmission of the same content to all the UEs.

Document titled "A collaborative approach to encrypted traffic", A. Z. Sarker et al., Ericsson, 2020-06-25, retrieved from the Internet—'https://www.ericsson.com/en/blog/2020/6/a-collaborative-approach-to-encrypted-traffic', downloaded on 2021-10-25, describes a solution of using Multiplexed Application Substrate over QUIC Encryption, MASQUE. The MASQUE offers a framework to use QUIC as substrate to open a tunnel to network proxy nodes. Such a proxy node, or a MASQUE server, can offer various services like QUIC proxy, UDP proxy or IP-forwarding. In addition, the QUIC-based tunneling also enables secure communication between an endpoint and the proxy node. This provides an opportunity to offer additional services like faster loss recovery by the proxy node, exposure of up-to-date network information that can help to assist congestion control, or even in-network bandwidth aggregation of multiple access links.

SUMMARY

Consequently, there is a need for an improved method and arrangement for handling delivery of content to the clients that alleviates at least some of the above cited problems.

It is therefore an object of the present disclosure to provide a method, a network function, a content delivery server and a computer program product for delivery of the content to the clients to mitigate, alleviate, or eliminate all or at least some of the above-discussed drawbacks of presently known solutions.

This and other objects are achieved by means of a method, a network function, a content delivery server and a computer program product as defined in the appended claims. The term exemplary is in the present context to be understood as serving as an instance, example or illustration.

According to a first aspect of the present disclosure, a method for handling delivery of content associated with a network-delivered service to user equipments, UEs in a wireless communication network is disclosed. The method is performed by a network function in the wireless communication network. The method comprises transmitting a connection request message to a content delivery server for establishing a secure tunnel connection between the network function and the content delivery server. The connection request message comprising an identifier, ID, of the network function, intended to the content delivery server. The method comprises transmitting a content request message from a first UE to the content delivery server requesting content associated with the network-delivered service for the first UE. The method comprises receiving a delivery request from the content delivery server, said delivery request requesting the network function to store and deliver the content from the network function. The method further comprises forwarding the content to the first UE through a secure tunnel connection between the network function and the first UE.

In some embodiments, the ID of the network function intended to the content delivery server represents one or more of: an identity of the network function, an address of the network function, a binary number, and a Multiplexed Application Substrate over QUIC Encryption, MASQUE, ID, and wherein the ID is assigned by a network operator of the network function.

In some embodiments, the connection request message comprises a capability associated with the network function indicating at least the capability of the network function to act as a proxy service node.

In some embodiments, the capability associated with the network function moreover indicates at least one of: information related to cache memory availability at the network function, and information related to number of UEs for which the network function can be used as the service node for delivery of the content.

In some embodiments, the method further comprises receiving an initial connection setup message from the first UE for establishing a secure tunnel connection between the network function and the first UE.

In some embodiments, the initial connection setup message from the first UE comprises an indication to the network function for establishing a secure tunnel connection with the content delivery server.

In some embodiments, the step of receiving a delivery request from the content delivery server comprises receiving the content continuously from the content delivery server when the content is available at the content delivery server. The method further comprises storing the content received from the content delivery server.

In some embodiments, the step of forwarding the content to the first UE comprises establishing a secure end-to-end tunnel connection between the first UE and the content delivery server and receiving the content from the content delivery server. The method comprises identifying the content related to the request message from the first UE and transmitting the identified content to the first UE through the secure tunnel connection.

In some embodiments, the network-delivered service is a subscription-based service comprising one or more of: a data service and over-the-top, OTT service.

In some embodiments, the network function is a proxy service node residing in a core network, CN, of the wireless communication network.

According to a second aspect of the present disclosure, a method for handling delivery of content associated with network delivered services to a plurality of user equipments in a wireless communication network is provided. The method is performed by a content delivery server. The method comprises receiving a connection request message from a network function for establishing a secure tunnel connection between the network function and the content delivery server, the connection request message comprising an identifier, ID, of the network function, intended to the content delivery server. The method comprises receiving a content request message from a first UE for the content associated with the network-delivered service through the network function. The method comprises initiating delivery of the content to the first UE with a secure end-to-end tunnel connection through the network function. The method comprises receiving a content request message from a second UE requesting content associated with the network-delivered service through the network function. The method comprises determining that the second UE is requesting for the content through the same network function, through which content is already delivered for the first UE. The method further comprises deciding to redirect a content request message for the content, from each of the second UE, to the network function, indicating the second UE to receive the content from the network function.

In some embodiments, the ID of the network function intended to the content delivery server (106) represents one or more of: an identity of the network function (104), an address of the network function (104), a binary number, and a Multiplexed Application Substrate over QUIC Encryption, MASQUE, ID, and wherein the ID is assigned by a network operator of the network function (104).

In some embodiments, the content requested by the second UE constitutes the content requested by the first UE or other content on the delivery server.

In some embodiments, the step of determining that the second UE is requesting the content through the same network function, through which content is already delivered for the first UE is based on the ID of the network function.

In some embodiments, the method further comprises delivering the content to the network function through the secure tunnel connection. Further, the method comprises transmitting a delivery request to the network function, said delivery request requesting the network function to deliver the content to the second UE.

In some embodiments, the method further comprises mapping the ID of the network function to a content ID corresponding to the content associated with the network delivered service. Further, the method comprises storing the mapping at the content delivery server.

In some embodiments, the step of determining that the second UE is requesting the content through the same network function comprises identifying the network function through which the request message is received from the second UE for the content based on the mapping of the ID of the network function to the content ID corresponding to the content associated with the network delivered service. Upon identifying the network function, the method comprises determining that the second UE is requesting the content through the same network function.

In some embodiments, the connection request message comprises a capability associated with the network function indicating at least the capability of the network function to act as a proxy service node.

In some embodiments, the capability associated with the network function moreover indicates at least one of: information related to cache memory availability at the network function, and information related to number of UEs for which the network function can be used as the service node for delivery of the content.

In some embodiments, the step of deciding to redirect the content request message for the content from the second UE to the network function, to indicate to the second UE to receive the content from the network function comprises determining that the network function is capable of delivering the content to the second UE based on the capability associated with the network function. Upon the determination, the method further comprises deciding to deliver the content to the second UE from the network function.

In some embodiments, the content delivery server is a third-party content server, wherein the network function is a proxy service node residing in a core network, CN, of the wireless communication network.

In some embodiments, the network-delivered service is a subscription-based service comprising one or more of: a data service and over-the-top, OTT service.

According to a third aspect of the present disclosure, a network function configured to operate in a wireless communication network for handling delivery of content associated with a network-delivered service to user equipments, UEs is provided. The network function being configured to cause transmission of a connection request message to a content delivery server for establishing a secure tunnel connection between the network function and the content delivery server, the connection request message comprising an identifier, ID, of the network function, intended to the content delivery server. The network function is configured to cause transmission of a content request message from the first UE to the content delivery server requesting content associated with the network-delivered service for the first UE. The network function is configured to cause reception of a delivery request from the content delivery server, said delivery request requesting the network function to store the content at the network function. Further, the network function is configured to cause forward of the content to the first UE through a secure tunnel connection between the network function and the first UE.

A fourth aspect is at least one network function comprising the apparatus of the third aspect.

According to a fifth aspect of the present disclosure, an apparatus for a content delivery server configured to operate in a wireless communication network for handling delivery of content associated with network delivered services to a plurality of user equipments in the wireless communication network is provided. The apparatus comprising a controlling circuitry being configured to cause reception of a connection request message from a network function for establishing a secure tunnel connection between the network function and the content delivery server, the connection request message comprising an identifier, ID, of the network function, intended to the content delivery server. The controlling circuitry is configured to cause reception of a content request message from a first UE requesting content associated with the network-delivered service through the network function. The controlling circuitry is configured to cause initiation of delivery of the content to the first UE with a secure end-to-end tunnel connection through the network function. The controlling circuitry is configured to reception of a content request message from a second UE requesting content associated with the network-delivered service through the network function. The control circuitry is configured to cause determination that the second UE is requesting for the content through the same network function, through which content is already delivered for the first UE. The control circuitry is further configured to cause decide of redirect a content request message for the content, from the second UE, to the network function, indicating the second UE to receive the content from the network function.

A fifth aspect is a content delivery server comprising the apparatus of the fourth aspect.

According to a sixth aspect of the present disclosure, there is provided a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

In some embodiments, any of the above aspects may additionally have features identical with or corresponding to any of the various features as explained above for any of the other aspects.

An advantage of some embodiments is that alternative and/or improved approaches are provided for handling delivery of content delivery by the network function.

An advantage of some embodiments is that efficient usage of available bandwidth for delivering the content to multiple UEs.

An advantage of some embodiments is that the delivery of the content to the UEs may be initiated or forwarded through the network function based on the capability of the network function. Thus, the overhead on the content delivery server may be reduced.

An advantage of some embodiments is that the secure tunnel connection is established between the network function and the UEs which is used for content delivery to ensure secure delivery of the content.

An advantage of some embodiments is that there may be reduced amount of traffic when multiple UE are redirected to the network function for the content. Further, when multiple UEs are accessing the content from the network function (i.e., when network function receives more hits), there may be monetary gains in reduced amount of traffic.

An advantage of some embodiments is that the delivery of the content to the UEs is initiated through the network function instead of the content delivery server. Thus, there is a latency gain in delivering the content when the network function is located sufficiently close to the UEs. As a result, the content may be retrieved in shorter time, which leads to shorter video startup times. Further, there may be faster adaptation when there is a change in resolution of the content.

An advantage of some embodiments is that when the network function is located close to an access network, the network function can tune its delivery and congestion control algorithms to be optimized for a particular access network type, e.g. 3GPP radio networks.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 13 is a block diagram of methods implemented in a communication system including a host computer, a base station, and a UE, according to some embodiments;

FIG. 14 is a block diagram of methods implemented in a communication system including a host computer, a base station, and a UE, according to some embodiments.

DETAILED DESCRIPTION

Figure 1A:
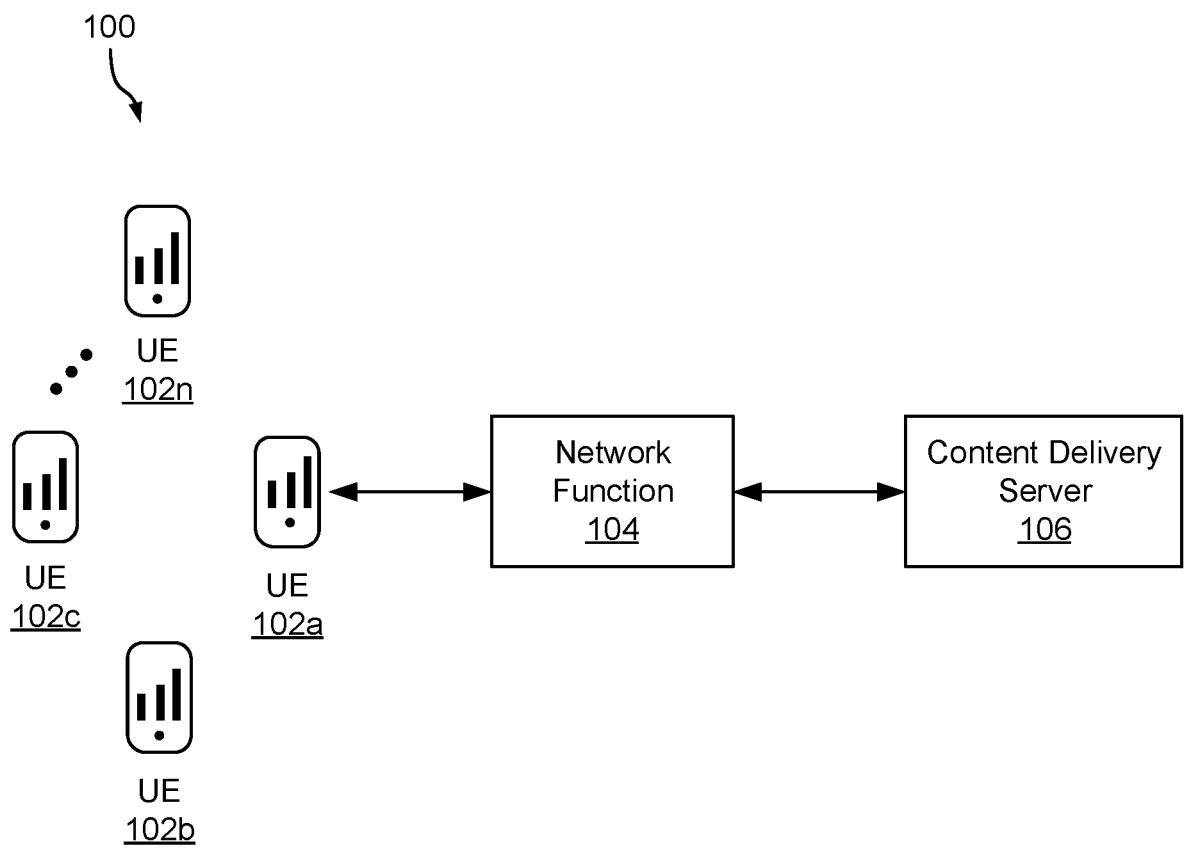
FIG. 1A discloses an example wireless communication network according to some embodiments.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

FIG. 1A discloses an example wireless communication network 100. The wireless communication network 100 comprises UEs 102a, 102b, 102c and so on to 102n. Further, there exists a network function 104 which may be present as a part of core network (not shown) of the wireless communication network 100. The network function 104 is accessible to the UEs 102a-102n through a radio access network comprising a plurality of base stations or evolved node base stations (not shown). The network function 104 may be configured to interact with a content delivery server 106, for example, through the internet using one or more suitable communication protocols for receiving content from the content provider server. It should be noted that the wireless communication network 100 is not limited to above-mentioned components, other components can also be present in the wireless communication network 100 other than the component shown in the FIG. 1A.

In some examples, the UEs 102a-102n may be a wireless device that is stationary or mobile and may also be referred to as a remote station, a mobile station, user equipment, mobile equipment, a terminal, a remote terminal, an access terminal, a station, etc. The wireless device may be a cellular phone, a personal digital assistant (PDA), a wireless modem, a wireless communication device, a handheld device, a subscriber unit, a laptop computer, etc.

In some examples, the network function 104 may be a proxy service node residing in the core network, CN, of the wireless communication network 100. The proxy service node may act as an intermediary program between each of the UEs 102a-102n and the network function 104. For example, the proxy service node may act as an intermediary program between a first UE i.e., the UE 102a and the content delivery server 106. Examples of the proxy service node may include a transparent proxy, a non-transparent proxy, a reverse proxy, or a Performance Enhancement Proxy, PEP. The transparent proxy does not modify a request or the response in order to authenticate or identify the UEs 102a-102n. The non-transparent proxy may modify the request or the response to provide some added service to the UEs 102a-102n, such as group annotation services, media type transformation, protocol reduction, or anonymity filtering. The reverse proxy may forward the request to the server which is behind another layer of firewalls. The PEP may improve the performance of protocols of the wireless communication network 100. The network function 104 receives a connection request message from the first UE 102a and forwards the received connection request message to the content delivery server 106.

In some examples, the content delivery server 106 may be a server that provides content requested by the first UE 102. The content in the content delivery server 106 may include any data content, a multimedia broadcast multicast service, MBMS content and over-the-top, OTT content or the like. The content from the content delivery server 106 may be delivered as a service which can be referred as a network delivered service. The network-delivered service may include a data service, a multimedia broadcast multicast service, MBMS, and over-the-top, OTT service for transmitting the content to the UEs 102a-102n.

Each of the UEs 102a-102b need to subscribe to the network-delivered service in order to access the content from the content delivery server 106 through the network function 104.

The content delivery server 106 may include suitable logic, circuitry, interfaces, and/or code that may be configured to receive the request forwarded from the network function 104, process the received request and provide the content associated with the received request to the UE 102. Examples of the content delivery server 106 may include, but are not limited to, an application server, a cloud server, a web server, a database server, a file server, a mainframe server, a third-party server, or a combination thereof.

In the wireless communication network 100, when multiple UEs 102a-102n transmit requests to the content delivery server 106 for accessing the same content, the content server has to provide the same content to all the UEs 102a-102n that are requesting the same content. As a result, large bandwidth is consumed for transmission of the same content to all the UEs.

Therefore, according to some embodiments of the present disclosure, the network function node 104 implements a method for efficiently handling delivery of the content to the UEs 102a-102n. Furthermore, the content delivery server 106 may implement a method for handling delivery of the content to the UEs 102a-102n through the network function. Although the embodiments described herein may be equally applicable for the UEs 102a-102n, the embodiments herein are described by considering a first UE 102a among any of the UEs 102a-102n which is requesting the content through the network function 104. It is assumed that each of the UEs 102a-102n in the wireless communication network 100 are subscribed to network delivered services for requesting the content from the content delivery server 106 through the network function 104.

According to some embodiments of the present disclosure, the network function 104 transmits a connection request message to the content delivery server 106 for establishing a secure tunnel connection between the network function 104 and the content delivery server 106.

For example, the connection request message comprises an identifier, ID, of the network function 104, intended to the content delivery server 106. The ID of the network function 104 represents or includes an identity or an address of the network function 104, a binary number, a Multiplexed Application Substrate over QUIC Encryption, MASQUE, ID. The ID of the network function 104 is assigned by a network operator of the network function 104. In some embodiments, the connection request message comprises a capability associated with the network function indicating at least the capability of the network function 104 to act as a proxy service node. The capability associated with the network function 104 relates to one or more of: information related to cache memory availability at the network function 104 and information related to number of UEs 102a-102n for which the network function 104 can be used as the service node for delivery of the content.

Further, the network function 104 transmits a content request message received from the first UE 102a to the content deliver server 106 requesting the content associated with the network-delivered service. For example, the network function 104 transmits the content request message from the first UE 102a to the content delivery server 106 requesting the contents for the first UE 102a.

The network function 104 receives a delivery request from the content deliver server 106 requesting the network function 104 to store the content and then to deliver the content. For example, when multiple UEs transmit requests for same content (e.g. live video content) through the network function 104, the content delivery server 106 may request the network function 104 to deliver the requested content according to the capability associated with the network function 104.

When the delivery request is received by the network function 104, the network function 104 initiates or forwards the delivery of the content to the first UE 102a. Thereby, the network function 104 functions as a proxy. Various embodiments for handling delivery of the content to the UEs 102a-102n are explained in conjunction with figures in the later parts of the description.

Figure 1B:
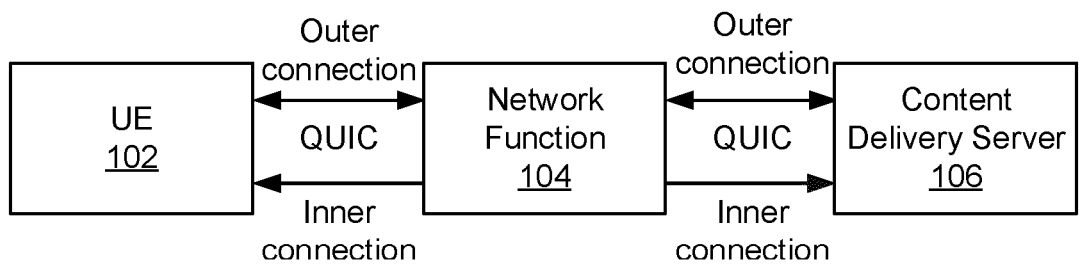
FIG. 1B discloses various connections between components of the wireless communication network according to some embodiments.

FIG. 1B discloses connection tunnel between the components of the wireless communication network. As depicted in FIG. 1B, there exists an inner connection and an outer connection among the UE 102, the network function 104, and the content delivery server 106. The inner connection is a secure tunnel connection between the UE 102 and the content delivery server 106. The inner connection is end-to-end encrypted to provide secure transmission between the UE 102 and the content delivery server 106. The outer connection carries information or content between the UE 102, the content delivery server 106 and network function 104.

For example, a Multiplexed Application Substrate over QUIC Encryption (MASQUE) based communication is established between the UE 102, the network function 104, and the content delivery server 106. In general, the MASQUE is a framework that configures and concurrently runs multiple proxied stream and datagram-based flows inside the wireless communication network. To facilitate communications between the UE 102 and the network function 104, the outer secure tunnel connection may be established using Quick UDP Internet Connections, QUIC, protocol. The QUIC protocol is a User Datagram Protocol, UDP, based stream-multiplexed and secure transport protocol with integrity protected header and encrypted payload which provides high security and improved latency in data communication. Similarly, to facilitate communications between the network function 104 and the content delivery server 106, the outer secure tunnel connection may be established using the QUIC protocol. Further, to facilitate communications between the UE 102 and the content delivery server 106, the inner secure tunnel connection may be established using the QUIC protocol. The inner secure tunnel connection may not be accessed by the network function 104.

The MASQUE provides the framework to use QUIC as a substrate to open a tunnel to network proxy nodes (e.g. network function 104) in the wireless communication network. The network function may be used as QUIC proxy, UDP proxy, or IP-forwarding. The QUIC based tunnelling enables secure communication between an endpoint (e.g. UE 102 or content delivery server 106) and the network function 104.

In some examples, the network function 104 may act as a Collaborative Performance Enhancement, COPE, node or function that is an entity which resides between two endpoints (e.g. UE 102 and content delivery server 106). The UE 102 may contact the COPE entity in order to request the content from the content delivery server 106. The COPE entity may forward the encrypted request to the content delivery server 106. Further, the endpoints (e.g. UE 102 and content delivery server 106) can share traffic information with the COPE entity such that the COPE entity can execute a requested performance enhancement function to improve the Quality of Service, QoS, of the traffic as well as optimize operations within the wireless communication network.

Figure 2:
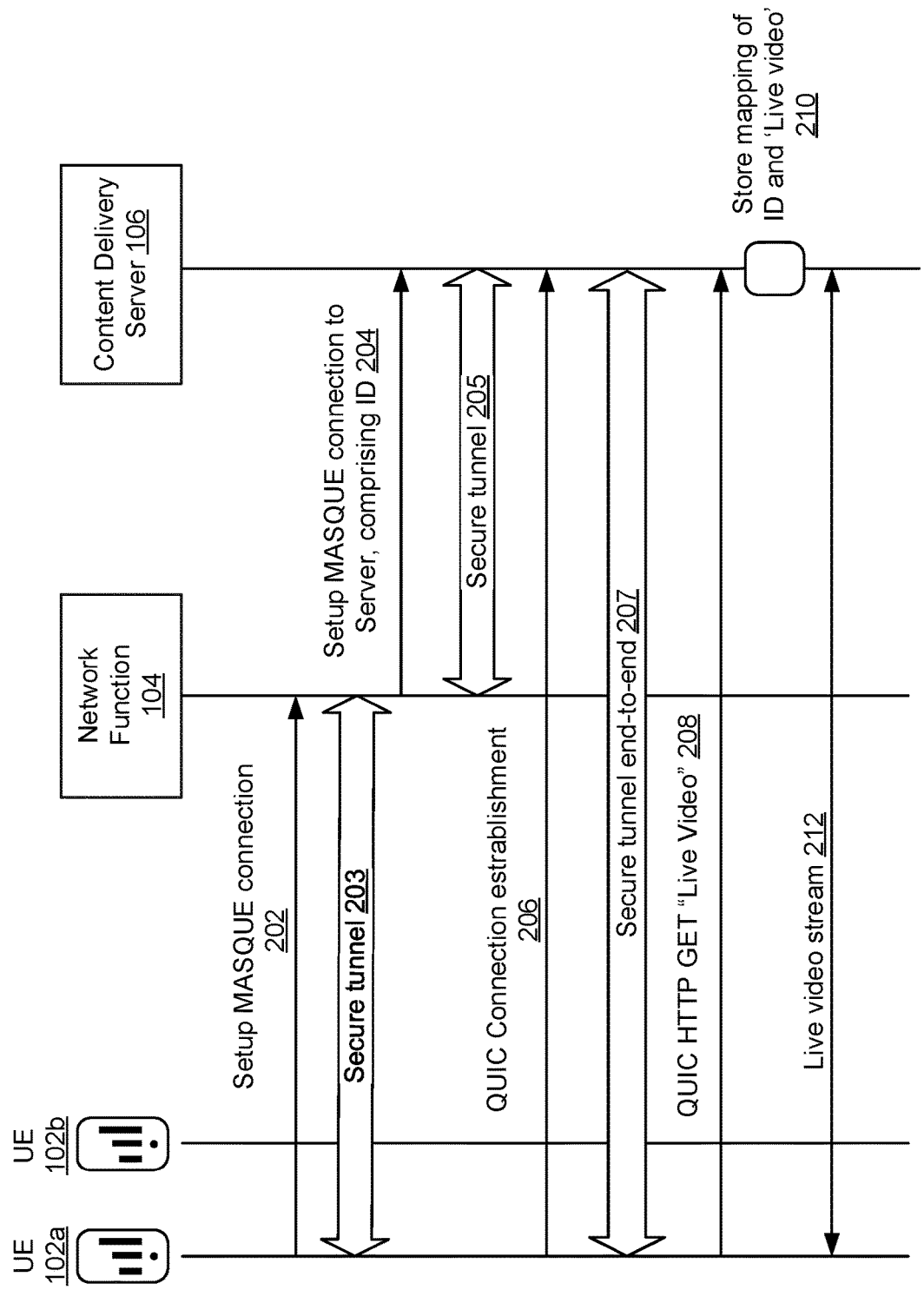
FIG. 2 is a signaling diagram illustrating example signaling according to some embodiments

FIG. 2 is a signaling diagram illustrating example signaling for delivery of content from the content delivery server 106 to the first UE 102a. The first UE 102a transmits 202 an initial connection setup message to the network function 104 to establish a secure tunnel connection 203 between the first UE 102a and the network function 104. In response to the initial connection setup message, the secure tunnel connection 203 is established between the first UE 102a and the network function 104 (referred as outer connection as shown in FIG. 1B). For example, a MASQUE connection is established between the first UE 102a and the network function 104. A QUIC protocol may be used for establishing the secure tunnel connection 203 between the first UE 102a and the network function 104. Further, the initial connection setup message from the first UE 102a may comprise, an indication to the network function 104 for establishing a secure tunnel connection with the content delivery server 106.

The network function 104 transmits 204 a connection request message to the content delivery server 106 for establishing a secure tunnel connection 205 between the network function 104 and the content delivery server 106. In response to the connection request message, the secure tunnel connection 205 between the network function 104 and the content delivery function 106 is established which is referred as outer connection (compare with FIG. 1B). For example, a secure MASQUE connection is established up between the network function 104 and the content delivery function 106. The QUIC protocol may be used for establishing the secure tunnel connection 205 between the network function 104 and the content delivery server 106. The connection request message comprises, but not limited to, the ID of the network function 104, intended to the content delivery server 106. The ID of network function 104 may be used to determine the number of UEs that are connected to the content delivery server 106 via the same network function 104. The ID of the network function, intended to the content delivery server 106 represents an identity of the network function 104, an address of the network function 104, a binary number, and a Multiplexed Application Substrate over QUIC Encryption, MASQUE, ID, and the ID is assigned by a network operator of the network function 104. Thus, the ID comprises a string of numbers, letters, alphanumeric characters or a combination of numbers and letters which makes the ID unique. For example, the possible formats for IDs are TeliaMaseqserverID47, TeliaMaseqserverID48 and so on. It should be noted that each network function 104 has a unique ID which is used to distinguish the network function from other network functions in the wireless communication network. The content delivery server 106 identifies the network function 104 using the ID. In some embodiments, the content delivery server 106 determines that the network function 104 is capable of acting as a proxy service node for delivery of the content when the connection request message comprising the ID of the network function 104 is transmitted to the content delivery server 106.

The connection request message further comprises capability associated with the network function 104. The capability associated with the network function 104 may include the content caching capability of the network function and the delivering capability of the network function. In some examples of the capability associated with the network function 104 may include, but not limited to, information related to cache memory availability at the network function 104, ability of the network function to act as a proxy service node for delivery of the content, information related to number of UEs for which the network function 104 can be used as the proxy service node for delivery of the content. The content caching capability comprise information such as—protocol support, such as QUIC and HTTP3. The delivery capability may comprises—URLs, the content delivery server should use in the redirection message to the UEs.

In some embodiments, the connection request message may be appended with the initial connection setup message received from the first UE 102a. The network function 104 may forward the connection request message appended with the initial connection setup message to the content delivery server 106.

The first UE 102a transmits 206 a connection establishment message to the content delivery server 106 through the network function for establishing a secure tunnel connection 207 between the first UE 102a and the content delivery server 106. In response to the connection establishment message, the secure tunnel connection 207 is established between the first UE 102a and the content delivery server 106 (referred as inner connection, compare with FIG. 1B). For example, a QUIC connection is established between the first UE 102a and the content delivery server 106. The secure tunnel connection 207 established between the first UE 102a and the content delivery server 106 is end-to-end secure tunnel connection, which cannot be intercepted by the network function 104.

Further, the first UE 102a transmits 208 a content request message requesting the content from the content delivery server 106 through the network function 104. For example, the content request message is a "QUIC HTTP GET live video" message to the content delivery server 106 through the network function 104. The content request message may be transmitted along with the content ID corresponding to the content requested in the content request message. For example, the requested content may comprise, but not limited to, video content, audio content, live video/audio content and over-the-top, OTT content.

The content delivery server 106 maps the ID of the network function 104 with the content ID corresponding to the requested content and stores 210 the mapping of the ID with the content. In some examples, the content ID comprises a URL associated with the requested content. For example, the content delivery server 106 may extract the ID of the network function 104 from the connection request message received from the network function 104. Further, the extracted ID of the network function 104 is mapped with the content ID corresponding to the requested content and the mapping is stored at the content delivery server 106. In some examples, the mapping is stored at the content delivery server 106 in a mapping table (as shown in Table 1).

TABLE 1

| Network function ID | Capability | Number of connected UEs | Content |
|---|---|---|---|
| NF1 | 512 MB | 2 | Content ID 1 |
| NF2 | 128 MB | 1 | Content ID 2 |

The content delivery server 106 initiates 212 delivery of the requested content to the first UE 102a. For example, the content delivery server 106 may identify the content according to the content request message received from the first UE 102a. The identified content may be transmitted to the first UE 102a through the secure tunnel end-to-end connection between the first UE 102a and the content delivery server 106.

Figure 3:
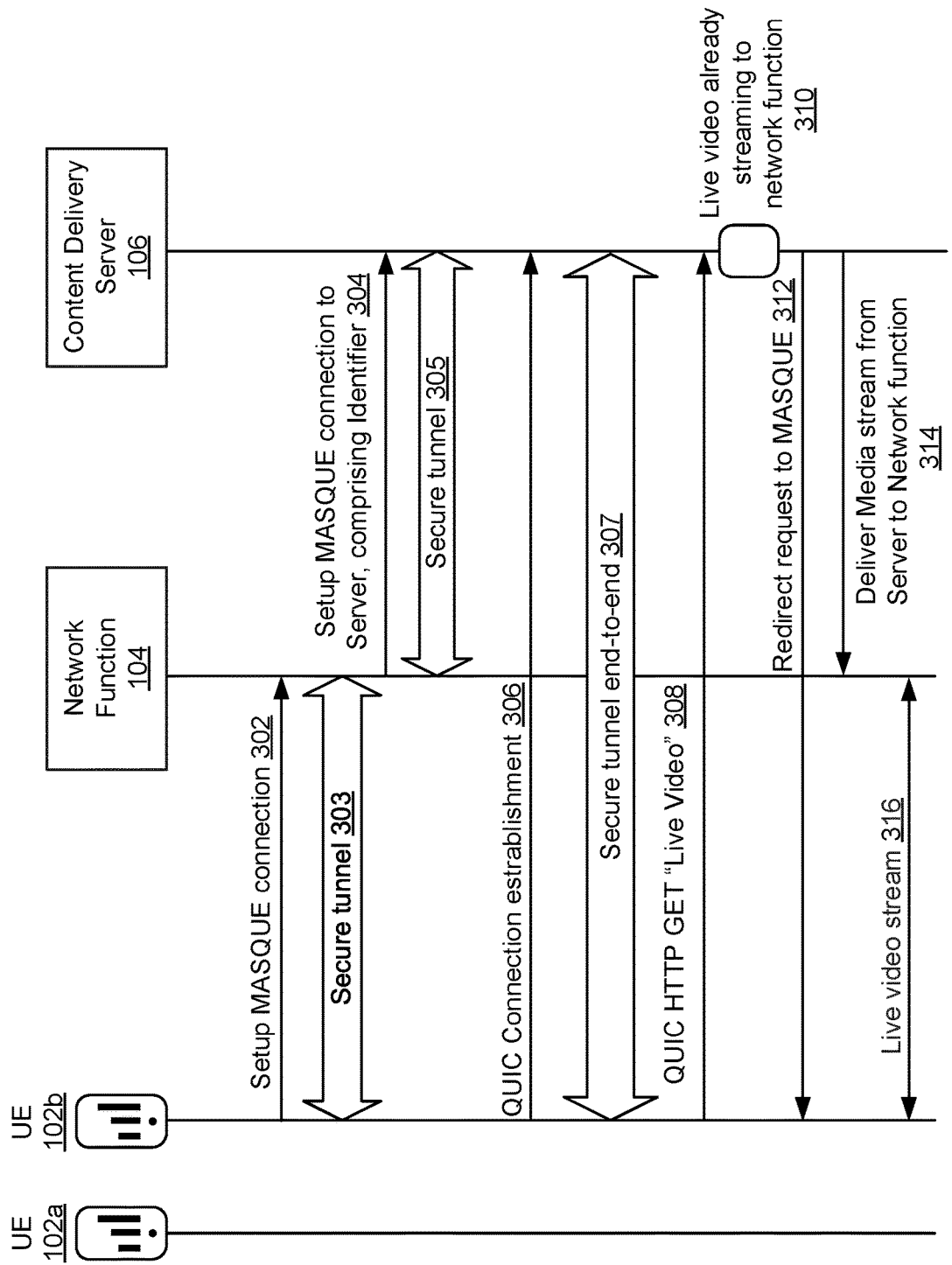
FIG. 3 is a signaling diagram illustrating example signaling according to some embodiments.

FIG. 3 is a signaling diagram illustrating example signaling for delivery of content to a second UE 102b. As depicted in FIG. 3, the second UE 102b transmits 302 an initial connection setup message to the network function 104 to establish a secure tunnel connection 303 between the second UE 102b and the network function 104. In response to the initial connection setup message, the secure tunnel connection 303 between the second UE 102b and the network function 104 is established. For example, a MASQUE connection is established between the second UE 102b and the network function 104. The QUIC protocol is used for establishing the secure tunnel connection 303 between the second UE 102b and the network function 104. The initial connection setup message may comprise an indication to the network function 104 for establishing a secure tunnel connection with the content delivery server 106.

The network function 104 transmits 304 a connection request message to the content delivery server 106 for establishing a secure tunnel connection 305 between the network function 104 and the content delivery server 106. In response to the connection request message, the secure tunnel connection 305 is established between the network function 104 and the content delivery server 106. For example, a MASQUE connection may be set up between the network function 104 and the content delivery function 106 and QUIC protocol may be used for establishing the secure tunnel connection 305 between the network function 104 and the content delivery server 106.

The connection request message may comprise the ID intended to the content delivery server 106. The connection request message may be appended with the initial connection setup message received from the second UE 102b. The network function 104 forwards the connection request message appended with the initial connection setup message to the content delivery server 106.

The UE 102b transmits 306 a connection establishment message to the content delivery server 106 for establishing a secure tunnel end-to-end connection 307 between the second UE 102b and the content delivery server 106. In response to the connection establishment message, the secure tunnel end-to-end connection between the second UE 102b and the content delivery server 106 is established.

The second UE 102b transmits 308 a content request message which is a "QUIC HTTP GET live video" message to the content delivery server 106 through the network function 104. In some embodiments, the content request message is transmitted along with the content ID corresponding to the content requested in the content request message.

Upon receiving the content request message from the second UE 102b via the network function 104, the content delivery server 106 determine 310 that there is already an ongoing content streaming via the network function 104 to the first UE 102a. For example, the content delivery server 106 identifies the network function through which the request message is received from the second UE 102b for the content. Further, the content delivery server 106 determines that the identified network function is same as the network function through which the ongoing content is being streamed or delivered to first UE 102a based on the mapping of the ID of the network function to the content ID associated with the requested content. For example, the network function through which the request message is received from the second UE 102b for the content is compared with the network function through which the ongoing content is delivering to first UE 102a using the mapping table stored in the content delivery server 106.

Further, the content delivery server 106 determines that the network function 104 is capable of caching and delivering the content to the second UE 102b based on the capability associated with the network function 104. For example, the content delivery server 106 extracts the capability of the network function 104 from the mapping table as shown in Table 1. The content delivery server 106 may determine that the network function is capable to act as a fan-out point for delivery of the content to second UE 102b based on the extracted capability of the network function 104. For example, if the extracted capability of the network function 104 is 512 MB and the content to be delivered to second UE 102b is within 512 MB, then the content delivery server decides that the network function 104 may act as a content delivery server for the second UE 102b.

The content delivery server 106 transmits 312 a redirect request to second UE 102b indicating the second UE 102b to receive the content from the network function 104. For example, the second UE 102b may be notified that the content shall be delivered from the network function 104 instead of content delivery server 106.

The content delivery server 106 transmits 314 the content requested by the second UE 102b to the network function 104 through the secure tunnel connection. For example, the media stream related to the content request message from second UE 102b is delivered to the network function 104.

The network function 104 forwards 316 the requested content to the second UE 102b. For example, the network function 104 may act as proxy service node for delivering the content to the second UE 102b.

Although the above sequence diagram depicts that the second UE 102b is requesting the content, there may be any number of UEs that may request the content from the content delivery server. The content delivery server, upon determining that the network function can act as a content cache based on the capability associated with the network function and also when the network function determines that there are multiple content requests from the UEs for the content via the same network function, then the content delivery server decides to deliver the content to the UEs from the network function. Thus, the content delivery server redirects the content requests from multiple UEs requesting the same content, to the network function, which reduces overhead at the content delivery server.

Thus, there may be reduced amount of traffic when multiple UE are redirected to the network function for the content. Further, when multiple UEs are accessing the content from the network function (i.e., when network function receives more hits), there may be monetary gains in reduced amount of traffic.

Further, the delivery of the content to the UEs is initiated through the network function 104 instead of the content delivery server 106. Thus, there is a latency gain in delivering the content when the network function 104 is located sufficiently close to the UEs.

Furthermore, when the network function 104 is located close to an access network, the network function 104 can tune its delivery and congestion control algorithms to be optimized for a particular access network type, e.g. 3GPP radio networks.

According to some embodiments, the QUIC protocol is used, for enhancing end-to-end performance between two connection endpoints, i.e., between a UE and the content delivery server 106. Lower latencies may be achieved, stream priorities can be used to perform logical separations of application flows within a single connection between the UE and the content delivery server 106.

According to some embodiments, the multiplexing feature of the QUIC protocol involves that several streams are transmitted over a single connection between the UE and the content delivery server 106 without inter-stream blockages. It is to be noted that the multiplexing feature of QUIC is unicast concept.

Figure 4:
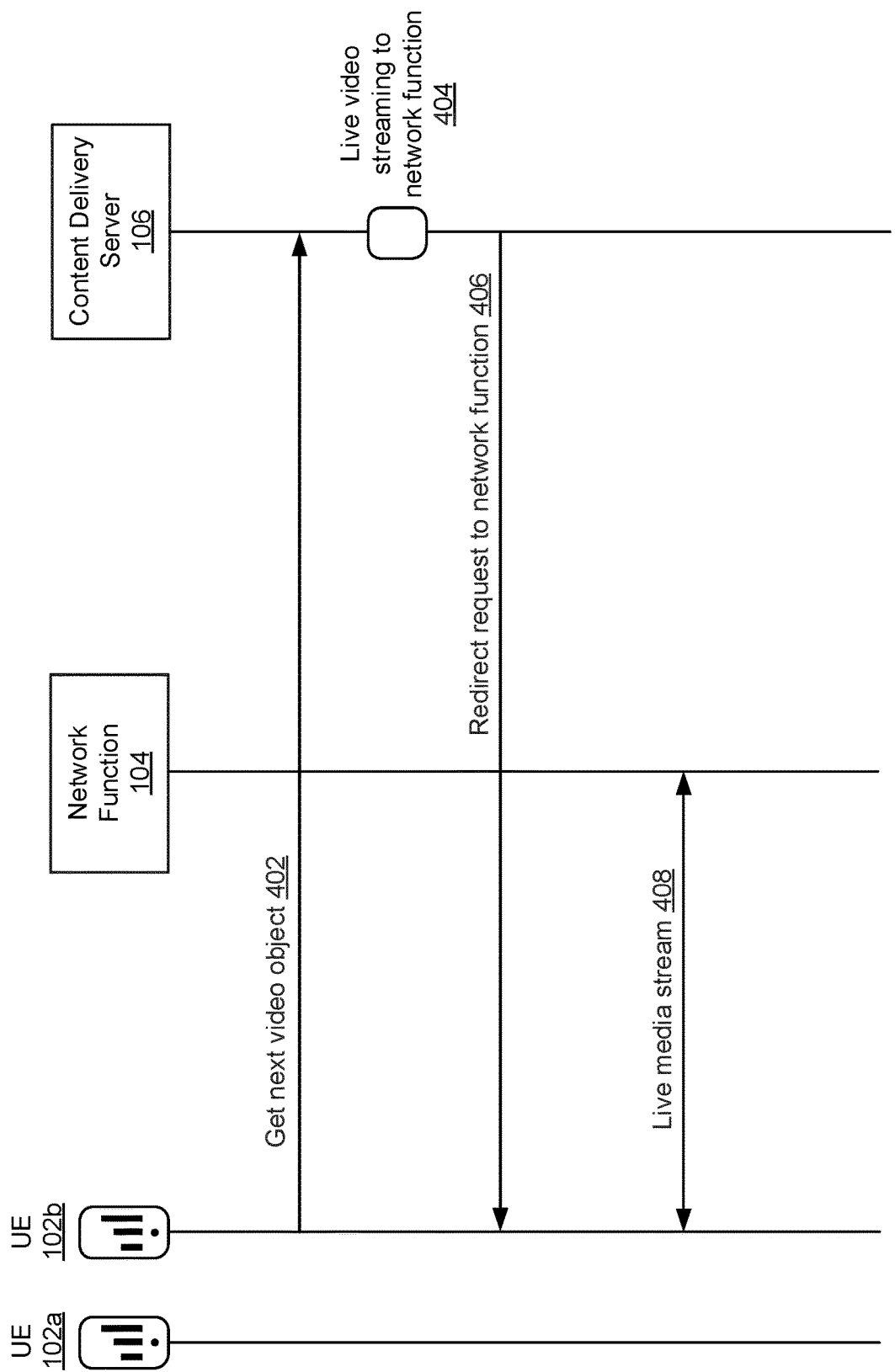
FIG. 4 is a signaling diagram illustrating example signaling according to some embodiments.

FIG. 4 is a signaling diagram illustrating example signaling according to some embodiments. In the FIG. 4, there is exists live video content being streamed to the UE 102a. For example, the live video content may comprise, but not limited to, a live match, a live performance, or a video from a security camera. The UE 102b transmits 402 a request to the content delivery server 106 to access next video object of an ongoing live video content. For example, the UE 102b may request to access the video content from the time the video content has involved in the session.

The content delivery server 106 may determine 404 that the live video content is streaming to network function 104. For example, it is determined that the live video content which is requested by UE 102b is already streaming through the network function 104. The content delivery server 106 may refer the mapping table (as shown in Table 1) to determine that the live video content is streaming through the network function 104.

The content delivery server 106 may send 406 a redirect request to the UE 102b indicating that the request to access the next video object to be redirected to the network function 104. For example, when it is determined that the live video content is streaming through the network function 104, the request to access the next video object may be redirected to the network function 104.

The network function 104 may deliver 408 the next video object of the live video content to the UE 102b. For example, upon receiving the redirect request, the network function 104 may forward the live video content to the UE 102b from the time the live video content has involved in the session. The network function 104 may act as a content delivery server for the second UE 102b. The request for the same live video content may not be transferred to content delivery server 106. As a result, the overhead on the content delivery server to deliver same live video content may be reduced. Further, wastage of bandwidth for delivering same content using different frequency band may be also reduced.

Figure 5:
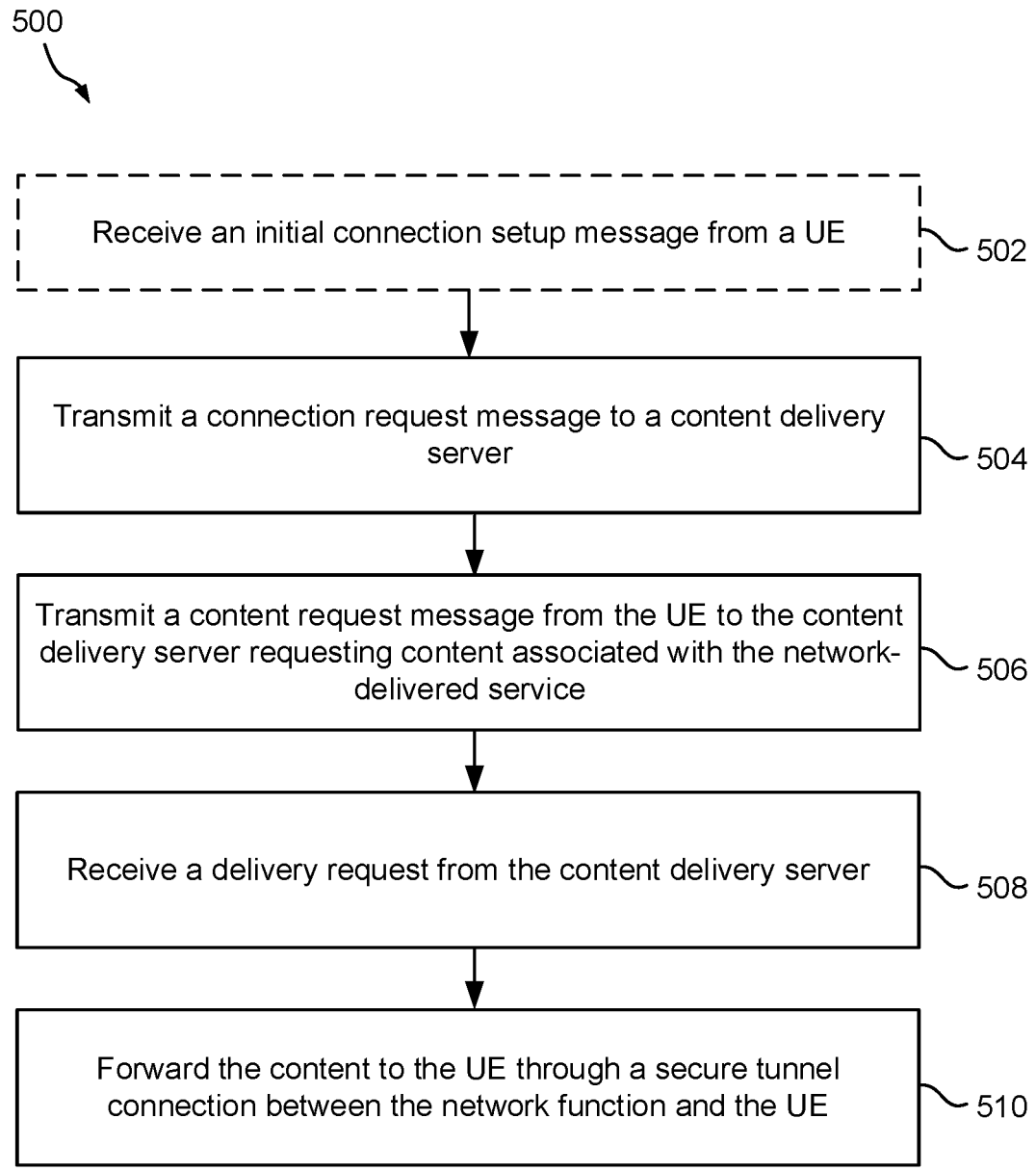
FIG. 5 is a flowchart illustrating example method steps according to some embodiments.

FIG. 5 is a flowchart illustrating example method steps of a method 500 performed by the network function in the wireless communication network for handling delivery of content associated with a network-delivered service to the UEs.

At step 504, the method 500 comprises transmitting a connection request message to the content delivery server. The connection request message is transmitted to the content delivery server to establish a secure tunnel connection between the network function and the content delivery server. The connection request message comprises the ID of the network function intended to the content delivery server. The ID of the network function intended to the content delivery server represents an identity of the network function, an address of the network function, a binary number, and a Multiplexed Application Substrate over QUIC Encryption, MASQUE, ID. The ID of the network function is assigned by a network operator of the network function.

The connection request message further comprises a capability associated with the network function indicating at least the capability of the network function to act as a proxy service node. In some examples, the capability associated with the network function related to at least one of information related to cache memory availability at the network function, and information related to number of UEs for which the network function can be used as the service node for delivery of the content.

Prior to the transmission of the connection request message to the content delivery server, the method 500 comprises receiving an initial connection setup message from the first UE, which can be any of the UEs in the wireless communication network, as illustrated by the optional step 502. The initial connection setup message is for establishing the secure tunnel connection between the network function and the first UE. The initial connection setup message indicates the network function for establishing a secure tunnel connection with the content delivery server.

At step 506, the method 500 comprises transmitting a content request message from the first UE to the content delivery server requesting content associated with the network-delivered service. For example, the requested content may comprise, but not limited to, video content, audio content, live video/audio content, a data service, and over-the-top, OTT content.

At step 508, the method 500 comprises receiving a delivery request from the content delivery server, said delivery request requesting the network function to store the content for delivery from the network function. The delivery request may be received from the content delivery server based on the ID of the network function.

The step 508 of receiving a delivery request from the content delivery server, requesting the network function to deliver the content to each of the at least one UE may in some embodiments comprise receiving a redirect request message to be transmitted to each of the UE. The redirect request message indicates each of the UE to receive the content from the network function.

At step 510, the method 500 comprises forwarding the content to the first UE through a secure tunnel connection between the network function and the first UE. The content requested by the first UE may be delivered from the network function. Thereby, the network function may act as fan-out point for the content requested by the UE(s).

The step 510 of forwarding the content to the first UE may in some embodiments comprise establishing a secure end-to-end tunnel connection between the first UE and the content delivery server. For example, a MASQUE connection may be setup between the first UE and the delivery content server to deliver the content to the first UE. The method may further comprise receiving the content associated with the network-delivered service from the content delivery server. The content is received to the network function. The method may further comprise identifying the content related to the request message from each of the UEs. Furthermore, the method may comprise transmitting the identified content to each of the UEs through the secure tunnel connection. Therefore, the network function may act as fan-out point for the delivery of the content to the UE.

Figure 6:
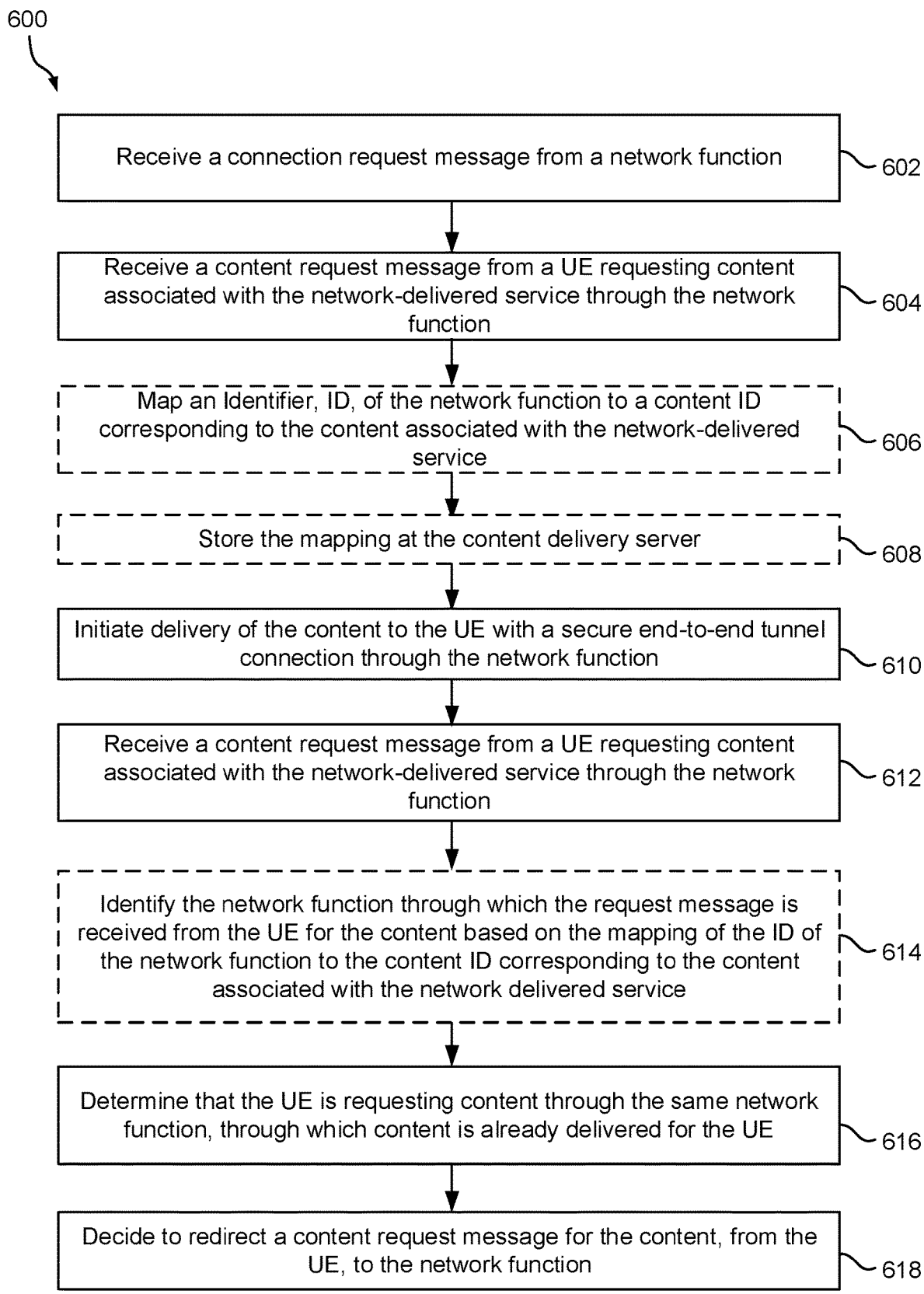
FIG. 6 is a flowchart illustrating example method steps according to some embodiments.

FIG. 6 is a flowchart illustrating example method steps of a method 600 performed by the content delivery server in the wireless communication network for handling delivery of content associated with a network-delivered service to the UE.

At step 602, the method 600 comprises receiving a connection request message from a network function for establishing a secure tunnel connection between the network function and the content delivery server. The connection request message comprising the ID of the network function, intended to the content delivery server.

At step 604, the method 600 comprises receiving a content request message from a first UE requesting content associated with the network-delivered service through the network function. The network-delivered service is a subscription based service comprising one or more of a data service and OTT service.

In an embodiment, the ID of the network function may be mapped with the content ID corresponding to the content associated with the network-delivered service (as shown in step 606 of FIG. 6). Further, the mapping may be stored in the content delivery server (as shown in step 608 in FIG. 6). For example, the mapping may be stored in the mapping table (as shown in Table 1, above).

At step 610, the method 600 comprises initiating delivery of the content to the first UE with a secure end-to-end tunnel connection through the network function. The content associated with the network-delivered service may be identified based on the content request message received from the first UE. Further, the identified content may be delivered to the first UE through the network function.

At step 612, the method 600 comprises receiving a content request message from a second UE requesting content associated with the network-delivered service through the network function.

At step 616, the method 600 comprises determining that the second UE is requesting content through the same network function, through which content is already delivered for the first UE. It is determined that the network function through which the content request message is received from the second UE is same as the network function 104 through which the content request message is received from the first UE.

The method 600 may further comprise identifying the network function through which the request message is received from each of the second UE for the content based on the mapping of the ID of the network function to the content ID corresponding to the content associated with the network delivered service as shown in optional step 614 of the FIG. 6. It is determined that the second UE is requesting the content through the network function when the network function is identified.

At step 618, the method 600 comprises deciding to redirect a content request message for the content, from the second UE, to the network function, indicating the second UE to receive the content from the network function. The redirection of the content request message is decided based on the capability of the network function.

The step 618 of deciding to redirect the content request message for the content, from the second UE, to the network function, indicating the second UE to receive the content from the network function may in some embodiments comprise determining that the network function is capable of delivering the content to the second UE based on the capability associated with the network function. The capability associated with the network function may be extracted from the mapping table stored in the content delivery server. The method further comprises deciding to deliver the content to the second UE from the network function upon the determination that the network function is capable of delivering the content to the second UE.

Figure 7:
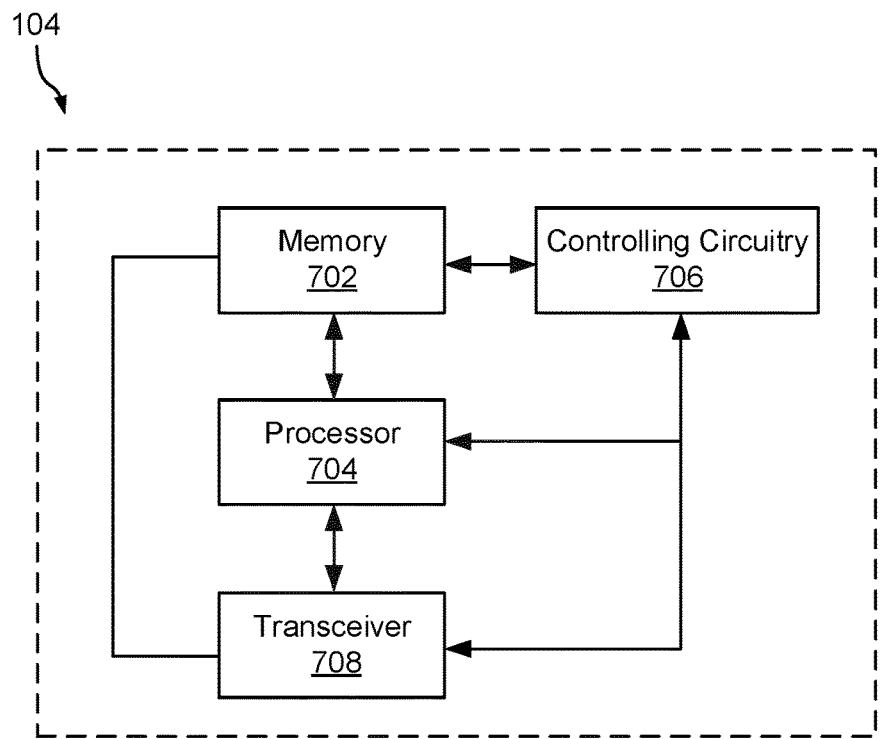
FIG. 7 is a schematic block diagram illustrating an example apparatus according to some embodiments.

FIG. 7 is an example schematic diagram showing an apparatus 104. The apparatus 104 may e.g. be comprised in a network function. The apparatus 104 is capable of initiating the delivery of the content in the wireless communication network and may be configured to cause performance of the method 500 for handling delivery of content associated with a network-delivered service to the UEs.

According to at least some embodiments of the present invention, the apparatus 104 in FIG. 7 comprises one or more modules. These modules may e.g. be a memory 702, a processor 704, a controlling circuitry 706, and a transceiver 708. The controlling circuitry 706, may in some embodiments be adapted to control the above mentioned modules.

The memory 702, the processor 704 and the transceiver 708 as well as the controlling circuitry 706, may be operatively connected to each other.

Optionally, the transceiver 708 may be adapted to transmit the connection request message to the content delivery server, transmit the content request message to the content delivery server, and receive the delivery request from the content delivery server to deliver the content to each of the at least one UE.

As described above, the various ways of receiving the delivery request from the content delivery server to deliver the content to each of the at least one UE, a few of which have been mentioned above in connection to the explanation of FIG. 5.

The controlling circuitry 706 may be adapted to control the steps as executed by the network function 104. For example, the controlling circuitry 706 may be adapted to initiate the delivery of the content to each of the at least one UE through a secure tunnel connection between the network function and each of the at least one UE. Thus, the controlling circuitry 704 may be adapted to deliver the content to the at least one UE (as described above in conjunction with the method 500 and FIG. 5).

In addition, the transceiver 708 is also adapted to receive the initial connection setup message from at least one UE, receive a redirect request message to be transmitted to each of the UEs, establish a secure end-to-end tunnel connection between the one or more UEs and the content delivery server, receive the content associated with the network-delivered service from the content delivery server, and transmit the identified content to each of the UEs through the secure tunnel connection.

Further, the processor 704 is adapted to identify the content related to the request message from each of the UEs.

Furthermore, the memory 702 is adapted to store the ID associated with the network function and the capability associated with the network function.

Figure 8:
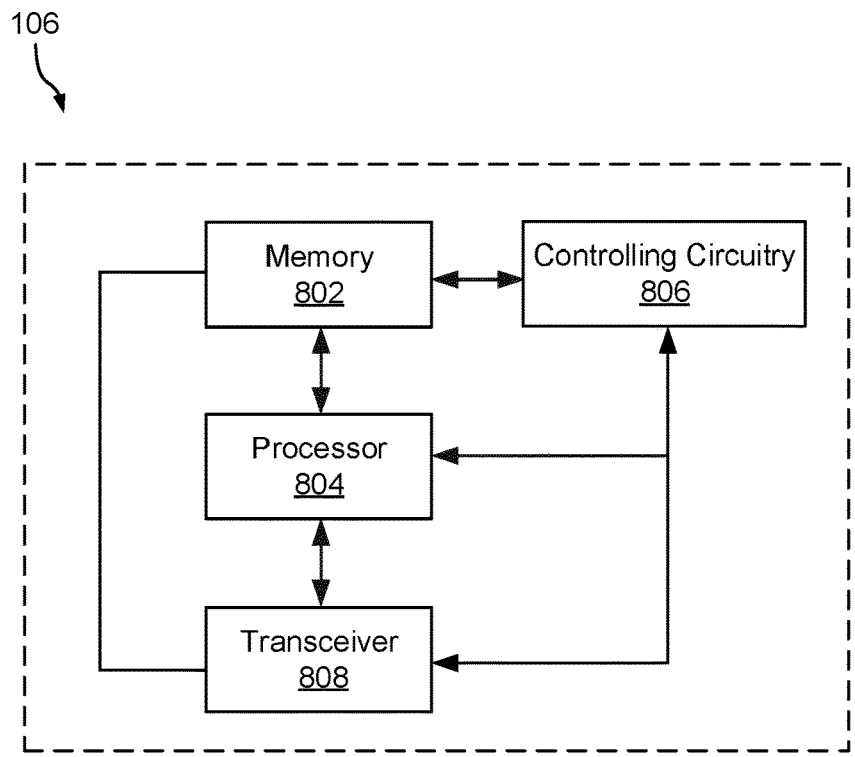
FIG. 8 is a schematic block diagram illustrating an example apparatus according to some embodiments.

FIG. 8 is an example schematic diagram showing an apparatus 106. The apparatus 106 may e.g. be comprised in a content delivery server. The apparatus 106 is capable of redirecting the delivery of the content to the network function and may be configured to cause performance of the method 600 for handling delivery of content associated with a network-delivered service to the UEs 102a-102c.

According to at least some embodiments of the present invention, the apparatus 106 in FIG. 8 comprises one or more modules. These modules may e.g. be a memory 802, a processor 804, a controlling circuitry 806, and a transceiver 808. The controlling circuitry 806, may in some embodiments be adapted to control the above mentioned modules.

The memory 802, the processor 804 and the transceiver 808 as well as the controlling circuitry 806, may be operatively connected to each other.

Optionally, the transceiver 808 may be adapted to receive the connection request message from the network function and receive the content request message from the first UE.

The controlling circuitry 806 may be adapted to control the steps as executed by the content delivery server 106. For example, the controlling circuitry 806 may be adapted to initiate the delivery of the content to the first UE through a secure end-to-end tunnel connection between the content delivery server and the first UE.

Further, the controlling circuitry 806 may be adapted to determine that second UE is requesting for the content through the network function (as described above in conjunction with the method 600 and FIG. 6).

Furthermore, the controlling circuitry 806 may be adapted decide to redirect a content request message for the content, from the second UE, to the network function, indicating the one or more second UEs to receive the content from the network function.

In addition, the transceiver 808 is also adapted deliver the content associated with the network delivered service to the network function through the secure tunnel connection and transmit the delivery request to the network function 104, said delivery request requesting the network function 104 to deliver the content to each of the second UE.

Further, the processor 804 is adapted to map the ID associated with the network function to the content associated with the network delivered service.

Furthermore, the memory 802 is adapted to store the mapping between the ID of the network function 104 to the content ID corresponding to the content associated with the network delivered service.

Further, the transceiver 808 is adapted to receive the content request message from the second UE requesting the content associated with the network delivered service through the network function.

The controlling circuitry 806 is adapted identify the network function through which the request message is received from the second UE for the content based on the mapping of the ID associated with the network function to the content ID associated with the network delivered service.

The controlling circuitry 806 is further adapted to determine that the second UE is requesting the content through the network function, determine that the network function is capable of delivering the content to the second UE based on the capability associated with the network function, and decide to deliver the content to the second UE from the network function.

Figure 9:
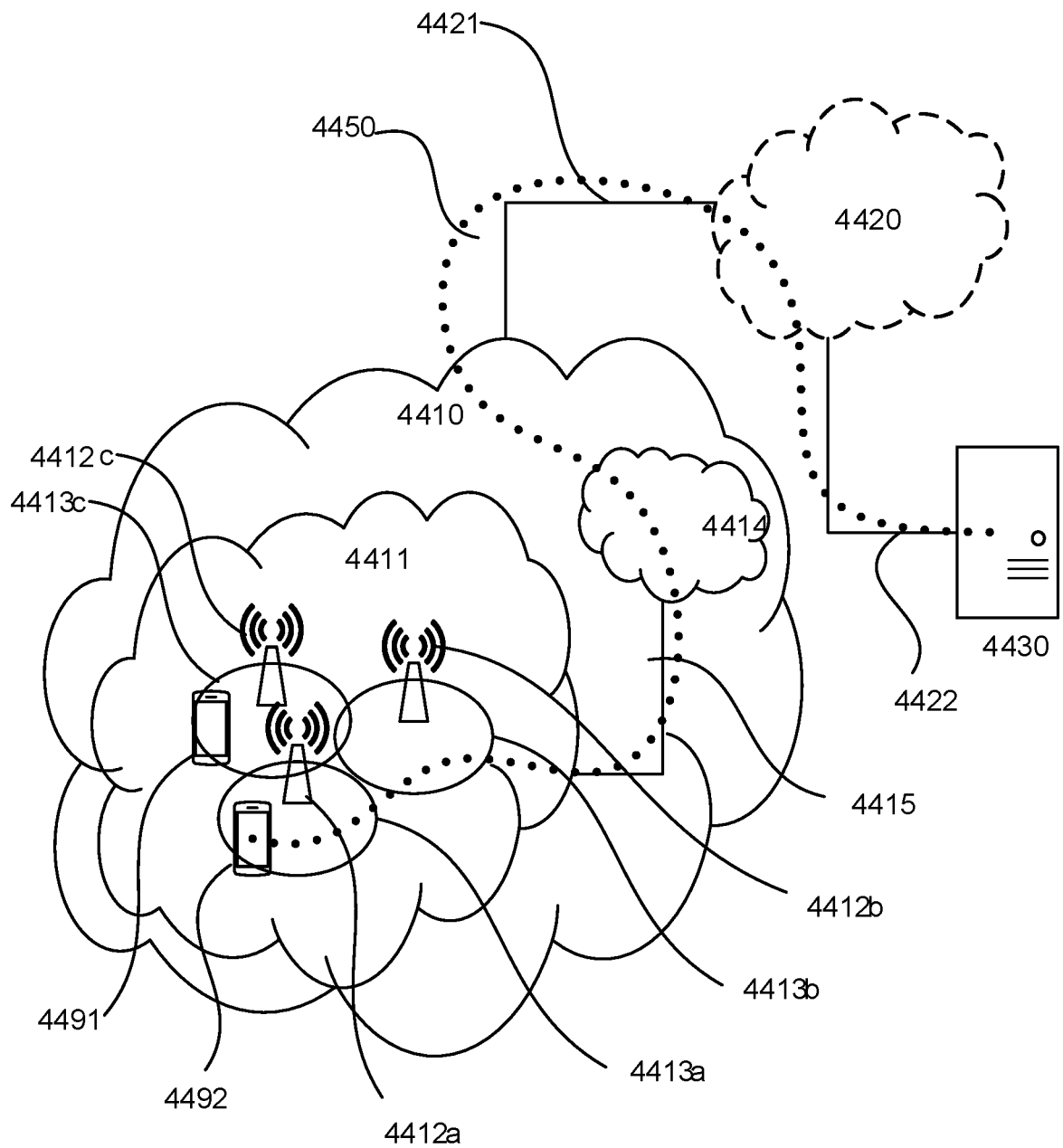
FIG. 9 is a block diagram of a telecommunication network connected via an intermediate network to a host computer, according to some embodiments.
Figure 10:
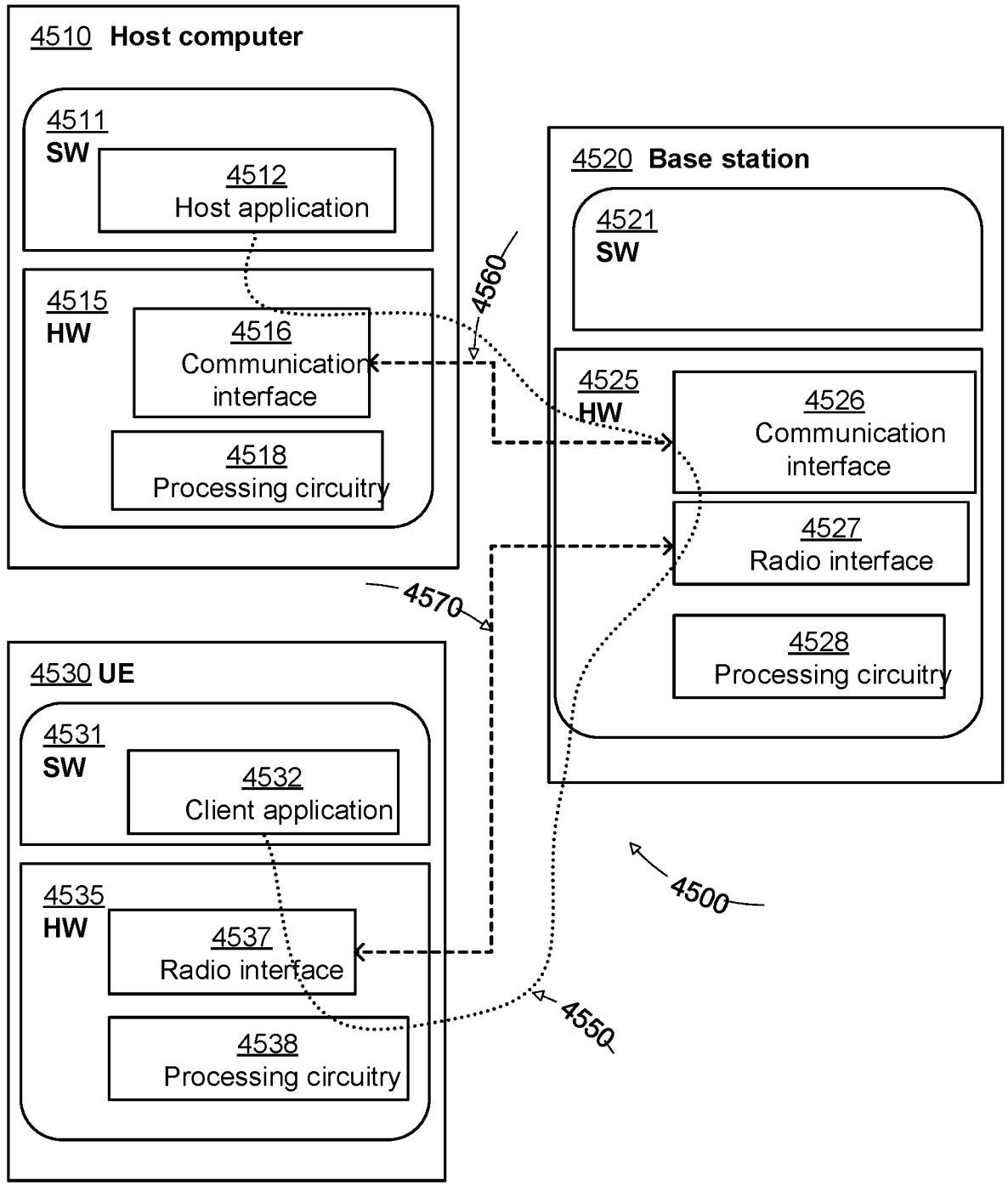
FIG. 10 is a block diagram of a host computer communicating via a base station with a UE over a partially wireless connection, according to some embodiments.

FIG. 9 is a block diagram of a telecommunication network connected via an intermediate network to a host computer according to some embodiments. With reference to FIG. 10, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 9 as a whole enables connectivity between the connected UEs 4491, 4492 and host computer 4430. The connectivity may be described as an over-the-top, OTT connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

FIG. 10 is a block diagram of a host computer communicating via a base station with a user equipment over a partially wireless connection. Example implementations, in accordance with an embodiment, of the UE, base station and host computer discussed in the preceding paragraphs will now be described with reference to FIG. 10. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities.

In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 9) served by base station 4520. Communication interface 4526 may be configured to facilitate connection 4560 to host computer 4510. Connection 4560 may be direct or it may pass through a core network (not shown in FIG. 10) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

Figure 15:
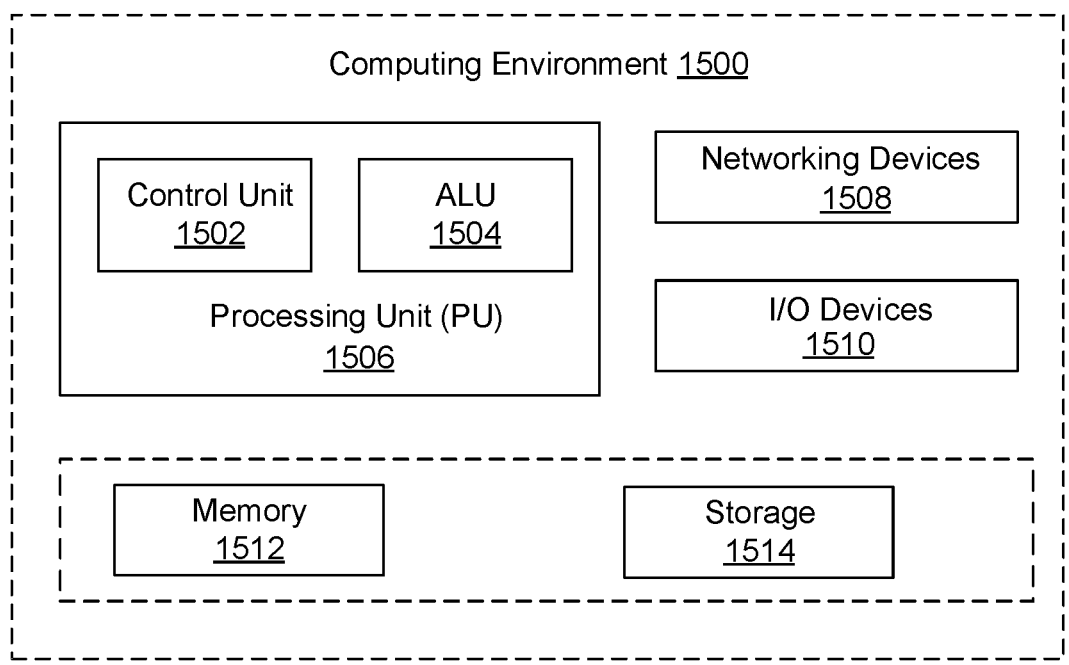
FIG. 15 discloses an example computing environment according to some embodiments.

It is noted that host computer 4510, base station 4520 and UE 4530 illustrated in FIG. 13 may be similar or identical to host computer 4430, one of base stations 4412*a*, 4412*b*, 4412*c* and one of UEs 4491, 4492 respectively. This is to say, the inner workings of these entities may be as shown in FIG. 15 and independently, the surrounding network topology may be that of FIG. 10.

In FIG. 10, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors or the like.

Figure 11:
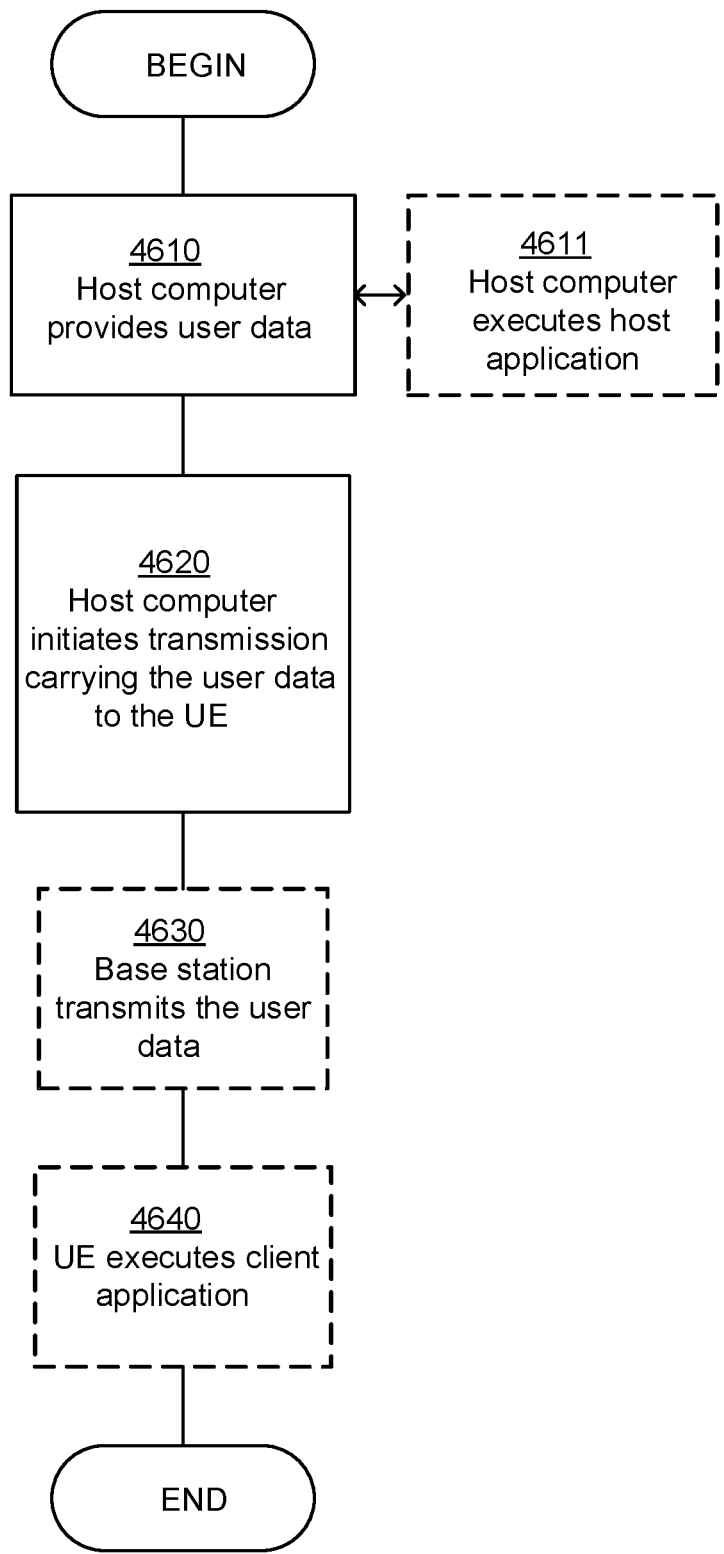
FIG. 11 is a block diagram of methods implemented in a communication system including a host computer, a base station, and a UE, according to some embodiments.

FIG. 11 is a block diagram of methods implemented in a communication system including a host computer, a base station, and a user equipment according to some embodiments. For simplicity of the present disclosure, only drawing references to FIG. 11 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 12:
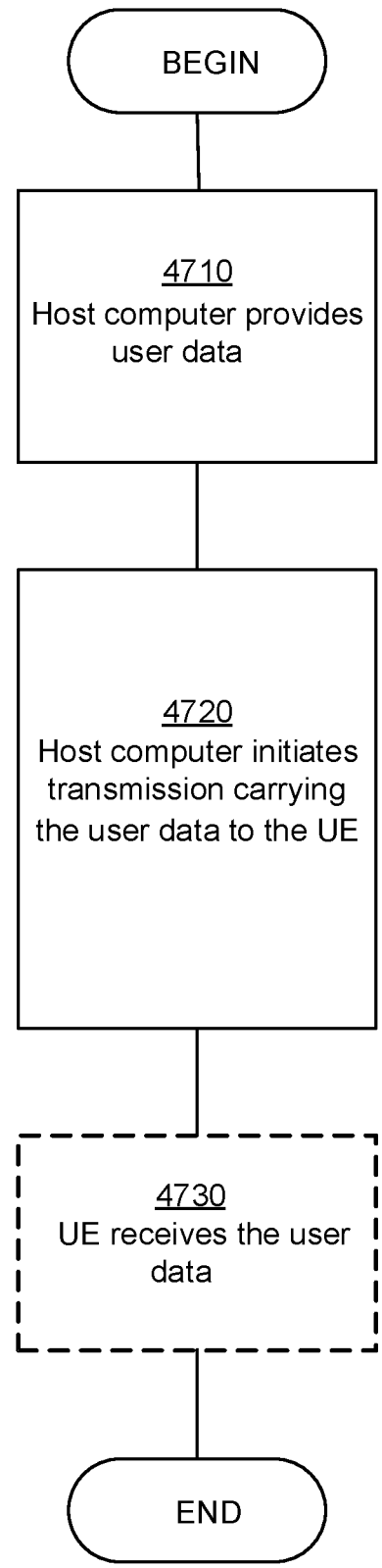
FIG. 12 is a block diagram of methods implemented in a communication system including a host computer, a base station, and a UE, according to some embodiments.

FIG. 12 is a block diagram of methods implemented in a communication system including a host computer, a base station, and a user equipment according to some embodiments. For simplicity of the present disclosure, only drawing references to FIG. 12 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 13 is a block diagram of methods implemented in a communication system including a host computer, a base station, and a user equipment according to some embodiments. For simplicity of the present disclosure, only drawing references to FIG. 13 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 14 is a block diagram of methods implemented in a communication system including a host computer, a base station, and a user equipment according to some embodiments. FIG. 14 is a flowchart illustrating a method implemented in a communication system, in accordance with one embodiment. The communication system includes a host computer, a base station and a UE. For simplicity of the present disclosure, only drawing references to FIG. 14 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

FIG. 15 illustrates an example computing environment 1500 implementing a method and the network function and the content delivery server as described in FIG. 5 and FIG. 6. As depicted in FIG. 15, the computing environment 1500 comprises at least one data processing module 1506 that is equipped with a control module 1502 and an Arithmetic Logic Unit (ALU) 1504, a plurality of networking devices 1508 and a plurality Input output, I/O devices 1510, a memory 1512, a storage 1514. The data processing module 1506 may be responsible for implementing the method described in FIG. 5 and FIG. 6. For example, the data processing module 1506 may in some embodiments be equivalent to the processor of the network function and the content delivery server described above in conjunction with the FIGS. 1-8. The data processing module 1506 is capable of executing software instructions stored in memory 1512. The data processing module 1506 receives commands from the control module 1502 in order to perform its processing. Further, any logical and arithmetic operations involved in the execution of the instructions are computed with the help of the ALU 1504.

The computer program is loadable into the data processing module 1506, which may, for example, be comprised in an electronic apparatus (such as a UE or a network node). When loaded into the data processing module 1506, the computer program may be stored in the memory 1512 associated with or comprised in the data processing module 1506. According to some embodiments, the computer program may, when loaded into and run by the data processing module 1506, cause execution of method steps according to, for example, any of the methods illustrated in FIGS. 5 and 6 or otherwise described herein.

The overall computing environment 1500 may be composed of multiple homogeneous and/or heterogeneous cores, multiple CPUs of different kinds, special media and other accelerators. Further, the plurality of data processing modules 1506 may be located on a single chip or over multiple chips.

The algorithm comprising of instructions and codes required for the implementation are stored in either the memory 1512 or the storage 1514 or both. At the time of execution, the instructions may be fetched from the corresponding memory 1512 and/or storage 1514, and executed by the data processing module 1506.

In case of any hardware implementations various networking devices 1508 or external I/O devices 1510 may be connected to the computing environment to support the implementation through the networking devices 1508 and the I/O devices 1510.

The embodiments disclosed herein can be implemented through at least one software program running on at least one hardware device and performing network management functions to control the elements. The elements shown in FIG. 15 include blocks which can be at least one of a hardware device, or a combination of hardware device and software module.

The invention claimed is:

1. A method for handling delivery of content associated with a network-delivered service to user equipments, UEs, in a wireless communication network, the method being performed by a network function of the wireless communication network, the method comprising:
   transmitting a connection request message to a content delivery server for establishing a secure tunnel connection between the network function and the content delivery server, the connection request message comprising an identifier, ID of the network function, intended to the content delivery server;
   transmitting a content request message from a first UE to the content delivery server requesting content associated with the network-delivered service;
   receiving a delivery request from the content delivery server, the delivery request requesting the network function to store the content for delivery from the network function;
   forwarding the content to the first UE through a secure tunnel connection between the network function and the first UE;
   the connection request message comprising a capability associated with the network function indicating at least the capability of the network function to act as a proxy service node; and
   the capability associated with the network function indicates at least one of:
      information related to cache memory availability at the network function; and
      information related to number of UEs for which the network function can be used as the service node for delivery of the content.

2. The method according to claim 1, wherein the ID of the network function intended to the content delivery server represents one or more of: an identity of the network function, an address of the network function, a binary number, and a Multiplexed Application Substrate over QUIC Encryption, MASQUE, ID, and wherein the ID is assigned by a network operator of the network function.

3. The method according to claim 1, further comprising an initial step of:
   receiving an initial connection setup message from the first UE for establishing a secure tunnel connection between the network function and the first UE.

4. The method according to claim 1, wherein the step of receiving a delivery request from the content delivery server comprises:
   receiving the content continuously from the content delivery server when the content is available at the content delivery server; and
   storing the content received from the content delivery server.

5. The method according to claim 1, wherein the step of forwarding the content to the first UE comprises:
   establishing a secure end-to-end tunnel connection between the first UE and the content delivery server;
   receiving the content from the content delivery server;
   identifying the content related to the request message from the first UE; and
   transmitting the identified content to the first UE through the secure tunnel connection.

6. The method according to claim 1, wherein the network-delivered service is a subscription-based service comprising one or more of: a data service and over-the-top, OTT service.

7. The method according to claim 1, wherein the network function is a proxy service node residing in a core network, CN, of the wireless communication network.

8. A method for handling delivery of content associated with network delivered services to a plurality of user equipments in a wireless communication network, the method being performed by a content delivery server, the method comprising:
receiving a connection request message from a network function for establishing a secure tunnel connection between the network function and the content delivery server, the connection request message comprising an identifier, ID, of the network function, intended to the content delivery server;
receiving a content request message from a first UE requesting content associated with the network-delivered service through the network function;
initiating delivery of the content to the first UE with a secure end-to-end tunnel connection through the network function;
receiving a content request message from a second UE requesting content associated with the network-delivered service through the network function;
determining that the second UE is requesting content through the same network function, through which content is already delivered for the first UE;
deciding to redirect the content request message for the content, from the second UE, to the network function, indicating the second UE to receive the content from the network function;
the connection request message comprising a capability associated with the network function indicating at least the capability of the network function to act as a proxy service node; and
the capability associated with the network function indicates at least one of:
information related to cache memory availability at the network function; and
information related to number of UEs for which the network function can be used as the service node for delivery of the content.

9. The method according to claim 8, wherein the ID of the network function intended to the content delivery server represents one or more of: an identity of the network function, an address of the network function, a binary number, and a Multiplexed Application Substrate over QUIC Encryption, MASQUE, ID, and wherein the ID is assigned by a network operator of the network function.

10. The method according to claim 8, wherein the content requested by the second UE constitutes the content requested by the first UE or other content on the delivery server.

11. The method according to claim 8, wherein the step of determining that the second UE is requesting content through the same network function, through which content is already delivered for the first UE is based on the ID of the network function.

12. The method according to claim 8, further comprising:
delivering the content to the network function through the secure tunnel connection; and
transmitting a delivery request to the network function, the delivery request requesting the network function to deliver the content to the second UE.

13. The method according to claim 8, further comprising:
mapping the ID of the network function to a content ID corresponding to the content associated with the network delivered service; and
storing the mapping at the content delivery server.

14. The method according to claim 8, wherein the step of determining that the second UE is requesting content through the same network function comprises:
identifying the network function through which the request message is received from second UE for the content, based on the mapping of the ID of the network function to the content ID corresponding to the content associated with the network delivered service.

15. The method according to claim 8, wherein deciding to redirect the content request message for the content from the second UE to the network function, to indicate to the second UE to receive the content from the network function further comprises:
further determining that the network function is capable of delivering the content to the second UE based on the capability associated with the network function; and
upon the determination, deciding to deliver the content to the second UE from the network function.

16. A network function configured to operate in a wireless communication network for handling delivery of content associated with a network-delivered service to user equipments, UEs, the network function comprising controlling circuitry being configured for:
causing transmission of a connection request message to a content delivery server for establishing a secure tunnel connection between the network function and the content delivery server, the connection request message comprising an identifier, ID, of the network function, intended to the content delivery server;
causing transmission of a content request message from a first UE to the content delivery server requesting content associated with the network-delivered service for the first UE;
reception of a delivery request from the content delivery server, the delivery request requesting the network function to store the content for delivery from the network function;
forwarding of the content to the first UE through a secure tunnel connection between the network function and the first UE;
the connection request message comprising a capability associated with the network function indicating at least the capability of the network function to act as a proxy service node, and
the capability associated with the network function indicates at least one of:
information related to cache memory availability at the network function; and
information related to number of UEs for which the network function can be used as the service node for delivery of the content.

17. The network function according to claim 16, wherein the network function is comprised in an apparatus.

18. An apparatus for a content delivery server configured to operate in a wireless communication network for handling delivery of content associated with a network-delivered service to a plurality of user equipments, UEs, the apparatus comprising a controlling circuitry configured to cause:
reception of a connection request message from a network function for establishing a secure tunnel connection between the network function and the content delivery server, the connection request message comprising an identifier, ID, of the network function intended to the content delivery server;

reception of a content request message from a first UE requesting content associated with the network-delivered service through the network function;

initiation of delivery of the content to the first UE with a secure end-to-end tunnel connection through the network function;

reception of a content request message from a second UE requesting content associated with the network-delivered service through the network function;

determination that the second UE is requesting for the content through the same network function, through which the content is already delivered for the first UE;

a decision to redirect a content request message for the content, from the second UE, to the network function, indicating the second UE to receive the content from the network function;

the connection request message comprising a capability associated with the network function indicating at least the capability of the network function to act as a proxy service node; and the capability associated with the network function indicates at least one of:
  information related to cache memory availability at the network function; and
  information related to number of UEs for which the network function can be used as the service node for delivery of the content.

19. The apparatus according to claim 18, wherein the apparatus is comprised in a content delivery server.

* * * * *